(12) United States Patent
Huang

(10) Patent No.: US 9,910,402 B2
(45) Date of Patent: Mar. 6, 2018

(54) TRANSMITTING ASSEMBLY OF TONER CARTRIDGE

(71) Applicant: GENERAL PLASTIC INDUSTRIAL CO., LTD., Taichung (TW)

(72) Inventor: Shih-Chieh Huang, Taichung (TW)

(73) Assignee: GENERAL PLASTIC INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 15/417,759

(22) Filed: Jan. 27, 2017

(65) Prior Publication Data

US 2017/0227918 A1 Aug. 10, 2017

(30) Foreign Application Priority Data

Feb. 4, 2016 (CN) .......................... 2016 1 0079132

(51) Int. Cl.
*G03G 15/00* (2006.01)
*G03G 21/16* (2006.01)
*F16H 1/06* (2006.01)
*G03G 21/18* (2006.01)

(52) U.S. Cl.
CPC .......... *G03G 21/1647* (2013.01); *F16H 1/06* (2013.01); *G03G 15/757* (2013.01); *G03G 21/1671* (2013.01); *G03G 21/1857* (2013.01)

(58) Field of Classification Search
CPC .......... G03G 21/1647; G03G 21/1671; G03G 21/1676; G03G 15/757; F16H 1/06
See application file for complete search history.

(56) References Cited

U.S. PATENT DOCUMENTS

| | | | | |
|---|---|---|---|---|
| 2008/0260428 A1* | 10/2008 | Ueno | ................... | G03G 15/757 399/167 |
| 2012/0183331 A1* | 7/2012 | Huang | ................. | G03G 15/757 399/167 |
| 2012/0251175 A1* | 10/2012 | Peng | .................... | G03G 15/757 399/159 |
| 2013/0322923 A1* | 12/2013 | Ikeda | ..................... | B29D 99/00 399/117 |
| 2015/0030353 A1* | 1/2015 | Wang | ........................ | F16D 3/06 399/167 |
| 2015/0050048 A1* | 2/2015 | Huang | ................. | G03G 15/757 399/167 |

(Continued)

*Primary Examiner* — Ryan Walsh
(74) *Attorney, Agent, or Firm* — Muncy, Geissler, Olds & Lowe, P.C.

(57) ABSTRACT

A transmitting assembly of a toner cartridge is provided. The transmitting assembly comprises a gear member, a tubular member disposed at the gear member and having an axial hole, an axial member provided with a shaft portion inserting into the axial hole and a head portion, an elastic member applying force on the axial member away from the gear member, two engaging claws provided with body portions disposed at the head portion and claw portions located at the body portions, and a torsional member connected with the engaging claws and applying force turning the engaging claws outward. The claw portions are located at two sides of the axial member, and abutting ends of the body potions are located at a center of the head portion. Accordingly, the transmitting assembly can be engaged with and separated from a driving member of an electronic image forming apparatus with ease and smoothness.

21 Claims, 13 Drawing Sheets

(56) References Cited

U.S. PATENT DOCUMENTS

| | | | |
|---|---|---|---|
| 2015/0050050 A1* | 2/2015 | Huang | G03G 21/1857 |
| | | | 399/167 |
| 2016/0124383 A1* | 5/2016 | Ikeda | G03G 21/1839 |
| | | | 399/111 |
| 2016/0231688 A1* | 8/2016 | Huang | G03G 21/1857 |
| 2016/0259290 A1* | 9/2016 | Ikeda | G03G 15/757 |
| 2017/0269547 A1* | 9/2017 | Zeng | G03G 21/1857 |

\* cited by examiner

TRANSMITTING ASSEMBLY OF TONER CARTRIDGE

BACKGROUND OF THE INVENTION

1. Field of the Invention

The present invention relates generally to transmitting assembly and more particularly, to a transmitting assembly disposed at a photosensitive roller of a toner cartridge.

2. Description of the Related Art

An electronic image forming apparatus has a copy document function. For example, the electronic image forming apparatus can copy original document with content by handwriting, printing or painting, and output paper with the same content as the original document. Therefore, the time for transcribing and cutting stencil would be reduced. In order to achieve the copy document function, the electronic image forming apparatus is equipped with one most important element, which is a photosensitive drum. The photosensitive drum is disposed in a toner cartridge and processed with charging, exposing, developing and transferring toner powders on a paper. The photosensitive drum mainly comprises a photosensitive roller and a transmitting assembly disposed at an end of the photosensitive roller. The transmitting assembly is adapted to be connected with a driving member disposed inside a housing of the electronic image forming apparatus, and transmits a rotational kinetic energy from the driving member to the photosensitive roller. Nowadays there may be many selections of transmitting assemblies with different structures for user. How to improve the design and function of those transmitting assemblies, such as engaging with or separating from the driving member through a structure of a transmitting assembly with further ease and smoothness, would become one of objectives which the related industry wants to achieve.

SUMMARY OF THE INVENTION

The present invention has been accomplished in view of the above-noted circumstances. It is an objective of the present invention to provide a transmitting assembly of a toner cartridge, which can be engaged with and separated from the driving member of the electronic image forming apparatus with ease and smoothness.

To attain the above objective, the present invention provides a transmitting assembly of a toner cartridge, which is adapted for being disposed at a photosensitive roller of the toner cartridge. The photosensitive roller has an imaginary axis. The transmitting assembly comprises a gear member, a tubular member, an axial member, an elastic member, two engaging claws and a torsional member. The gear member is adapted for being disposed at an end of the photosensitive roller. The tubular member is disposed at the gear member and has an axial hole, and the axial hole extends along the imaginary axis. The axial member has a shaft portion provided with an end inserting into the axial hole of the tubular member, and a body portion located at the other end of the shaft portion; the shaft portion is movable relative to the tubular member along the imaginary axis. The elastic member is accommodated in the axial hole of the tubular member and abutted against the shaft portion of the axial member, and applies a force on the axial member away from the gear member. Each of the engaging claws has a body portion rotatably disposed at the head portion of the axial member, and a claw portion located at an end of the body portion; the other end of the body portion forms an abutting end. The claw portions of the two engaging claws are respectively located at two sides of the head portion of the axial member; the body portions of the two engaging claws are located at a center of the head portion. The torsional member is connected with the axial member and the two engaging claws, and applies a force turning the two engaging claws outward.

To attain the above objective, the present invention provides another transmitting assembly of a toner cartridge, which is adapted for being disposed at a photosensitive roller of the toner cartridge. The photosensitive roller has an imaginary axis. The transmitting assembly comprises a gear member, an axial member, two engaging claws and a torsional member. The gear member is adapted for being disposed at an end of the photosensitive roller. The axial member has a shaft portion provided with an end disposed at the gear member, and a body portion located at the other end of the shaft portion; the shaft portion extends along the imaginary axis. Each of the engaging claws has a body portion rotatably disposed at the head portion of the axial member, and a claw portion located at an end of the body portion; the other end of the body portion forms an abutting end. The claw portions of the two engaging claws are respectively located at two sides of the head portion of the axial member; the body portions of the two engaging claws are located at a center of the head portion. The torsional member is connected with the axial member and the two engaging claws, and applies a force turning the two engaging claws outward.

The claws portions of the two engaging claws would be turned outward and the abutting ends swing upwardly because the torsional member applies the force on the two engaging claws. When the transmitting assembly is engaged with the driving member of the electronic image forming apparatus, the driving member abuts against those abutting ends, those claw portions would be turned inward and engaged with driving member, and a rotational kinetic energy from the driving member can be transmitted to the photosensitive roller. On the other hand, when the transmitting assembly is separated from the driving member, those abutting ends are not abutted against the driving member anymore, those claw portions would be turned outward and backed to an original state where the claw portions are not engaged with the driving member. Accordingly, the transmitting assembly can be engaged with and separated from the driving member with ease and smoothness.

DETAILED DESCRIPTION OF THE INVENTION

Figure 1:
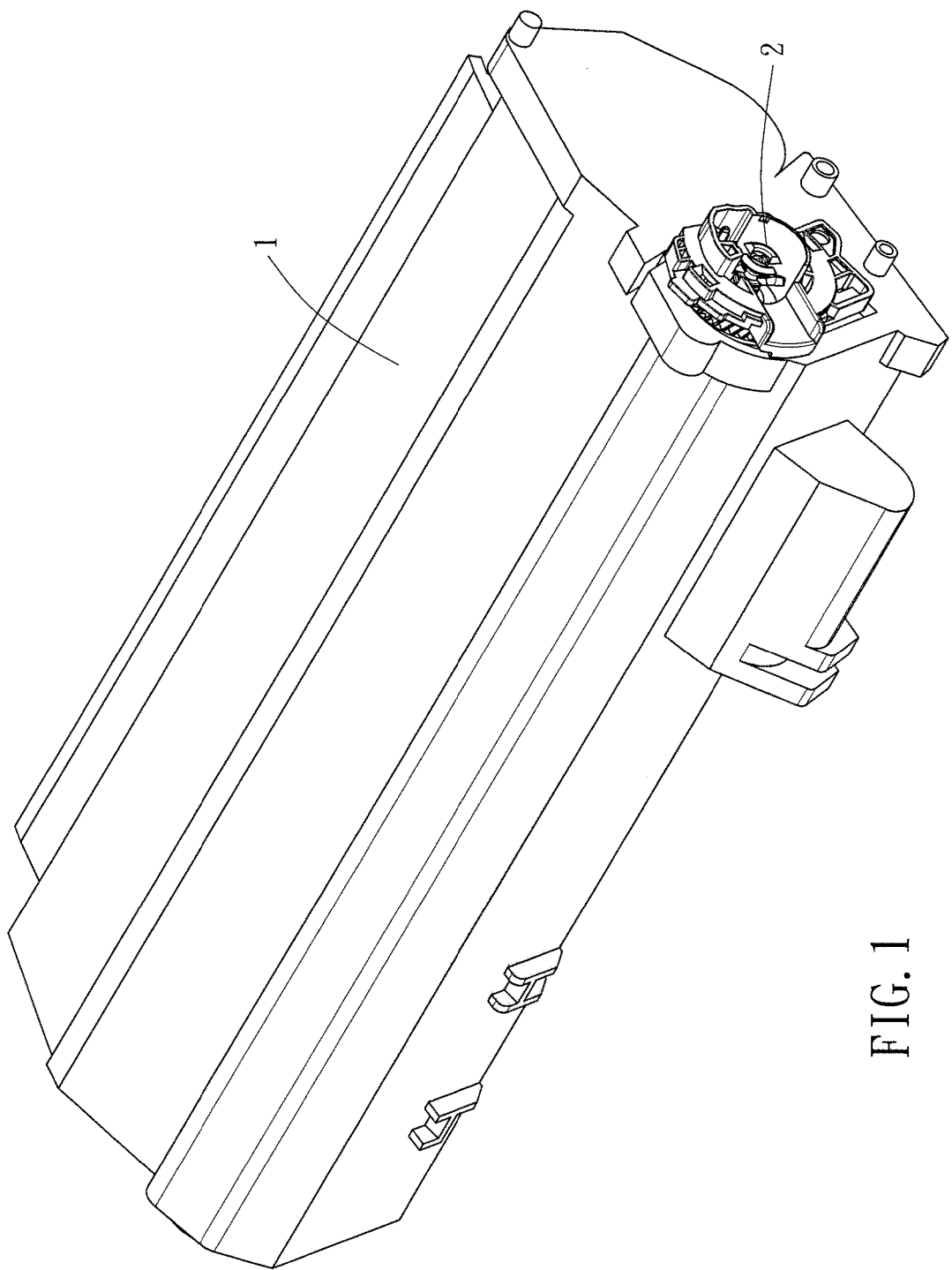
FIG. 1 is a perspective view of a transmitting assembly of a toner cartridge mounted on the toner cartridge according to a first preferred embodiment of the present invention.
Figure 2:
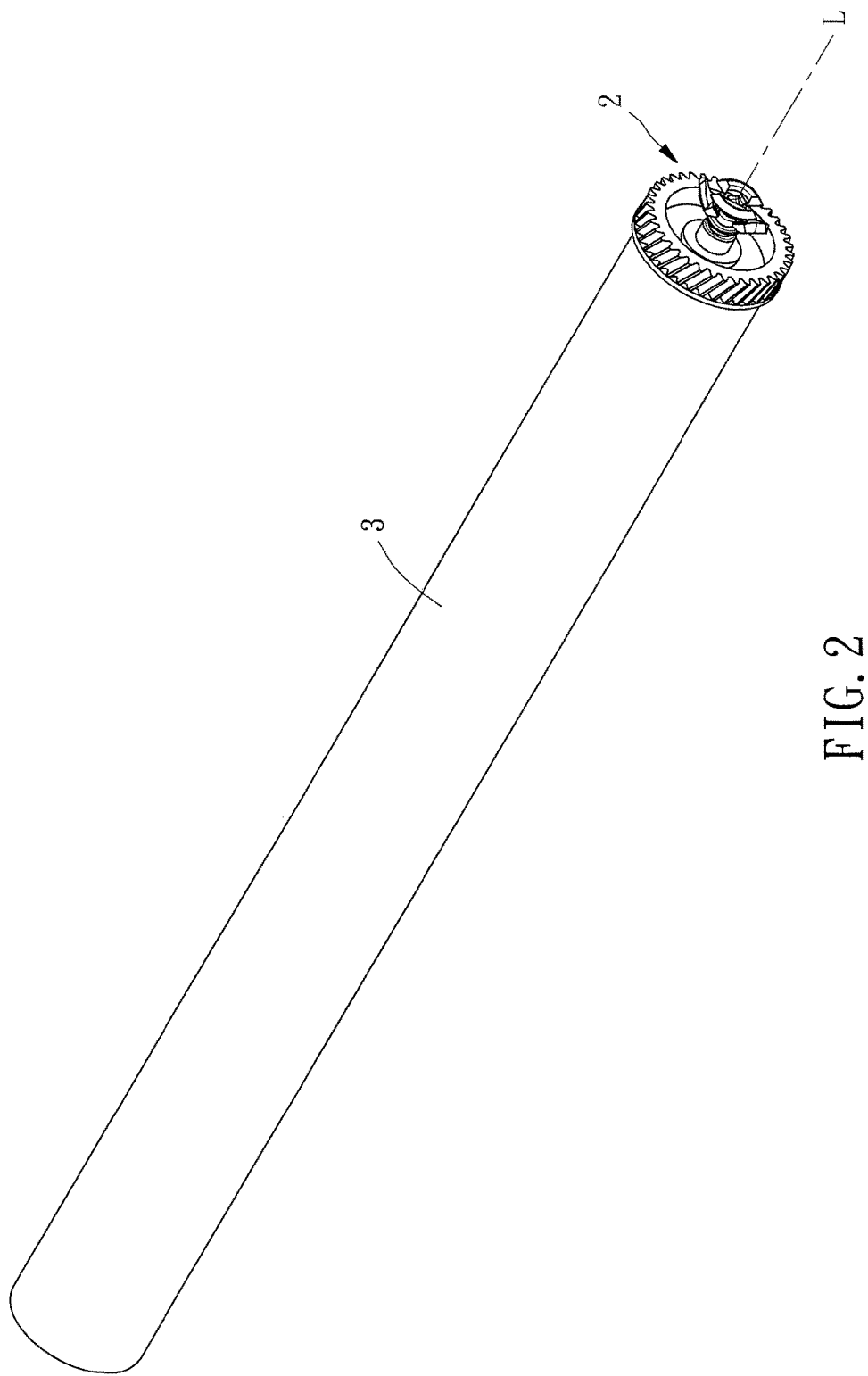
FIG. 2 is a perspective view of the transmitting assembly of the toner cartridge disposed at a photosensitive roller according to the first preferred embodiment of the present invention.
Figure 3:
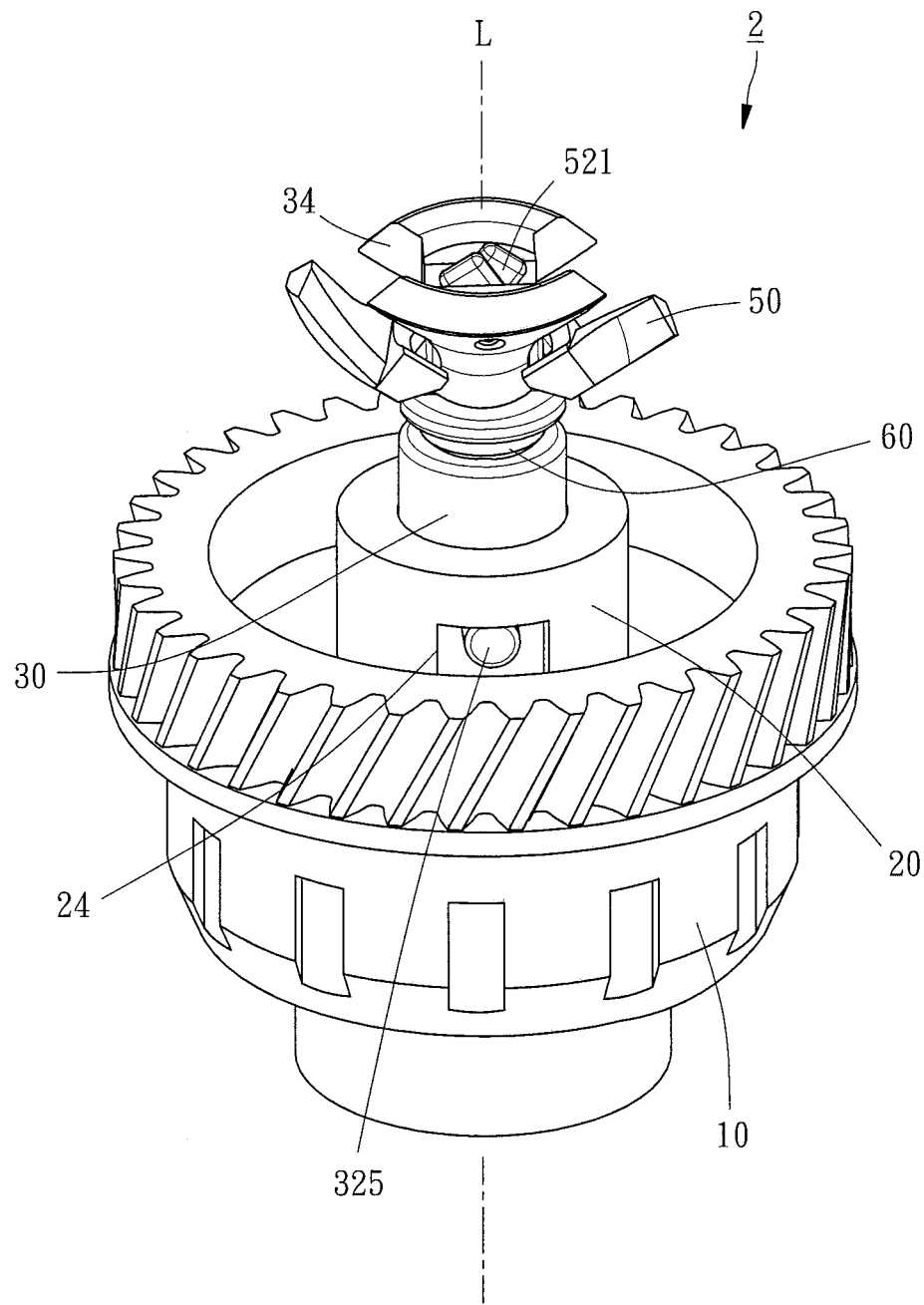
FIG. 3 is a perspective view of the transmitting assembly of the toner cartridge according to the first preferred embodiment of the present invention.
Figure 4:
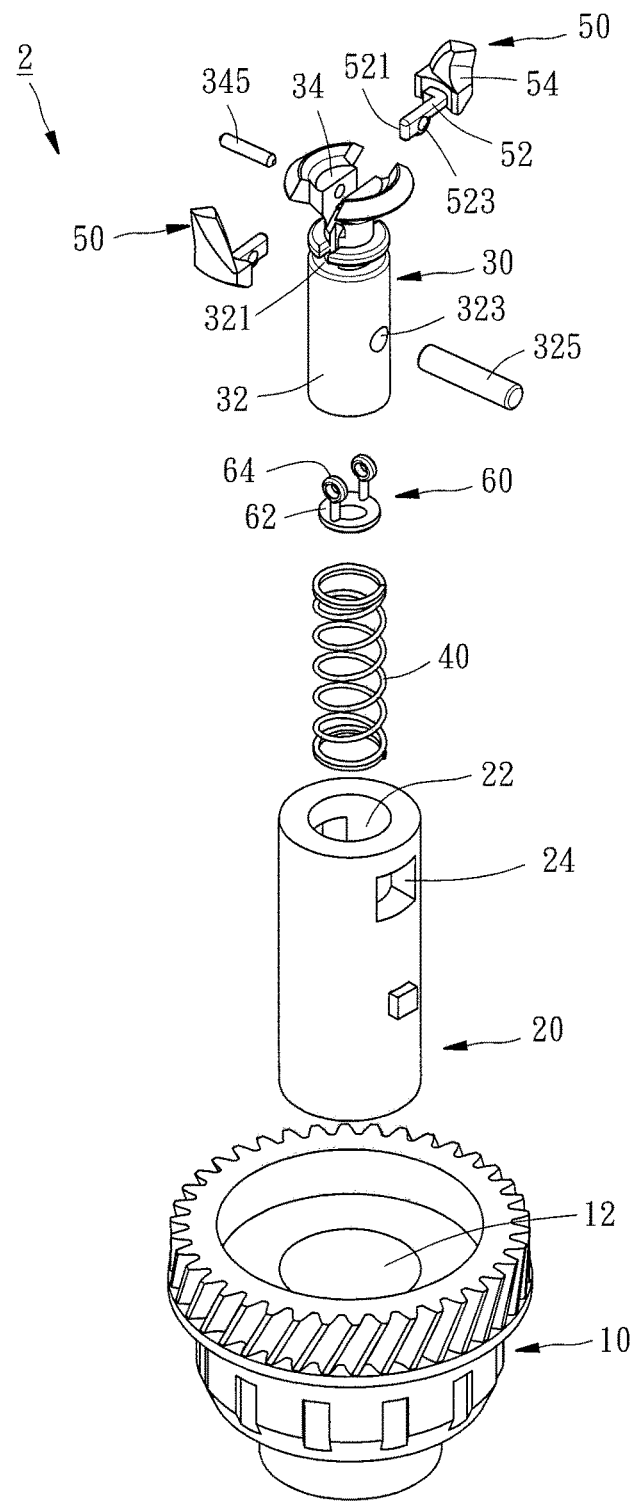
FIG. 4 is an exploded perspective view of the transmitting assembly of the toner cartridge according to the first preferred embodiment of the present invention.

FIG. 1 illustrates a transmitting assembly 2 of a toner cartridge 1 mounted on the toner cartridge 1 according to a first preferred embodiment of the present invention. Referring to FIG. 2, the transmitting assembly 2 is adapted for being disposed at a photosensitive roller 3 of the toner cartridge 1, and the photosensitive roller 3 is disposed inside the toner cartridge 1 and has an imaginary axis L. Referring to FIGS. 3 and 4, the transmitting assembly 2 comprises a gear member 10, a tubular member 20, an axial member 30, an elastic member 40, two engaging claws 50 and a torsional member 60.

The gear member 10 is fixed at an end of the photosensitive roller 3 and has the same axis with the imaginary axis L. The gear member 10 has an accommodating hole 12, the accommodating hole 12 is a blind hole, and however, the accommodating hole 12 may be a through hole in other embodiments.

The tubular member 20 inserts into the accommodating hole 12 of the gear member 10, and the tubular member 20 having an axial hole 22 and two side holes 24. The axial hole 22 extends along the imaginary axis L, and the two side holes 24 are located at two sides of the axial hole 22. In the present embodiment, the tubular member 20 is pre-disposed at a predefined position before an injection molding of the gear member 10, and the tubular member 20 is connected with the gear member 10 when the injection molding of the gear member 10. In other embodiments, the tubular member 20 may connected with the gear member 10 in coupling, adhering, bolt fastening or any other connecting manner.

Figure 5:
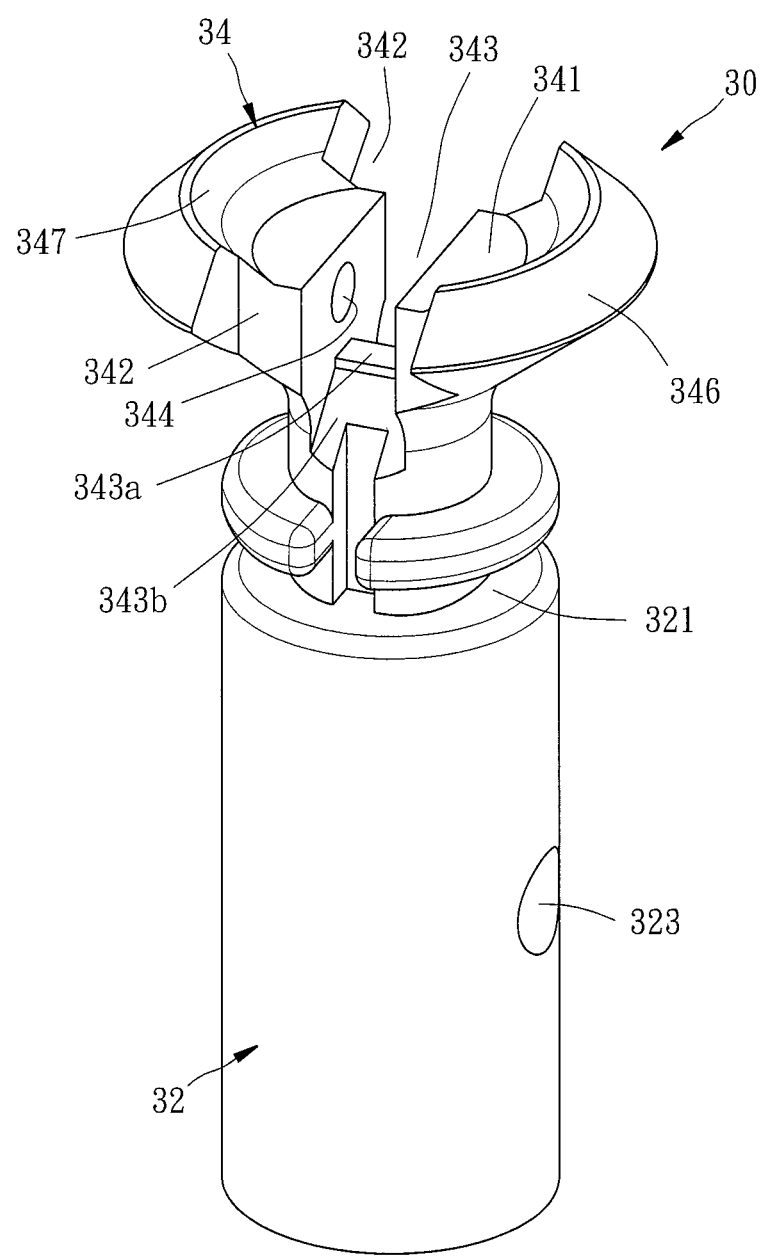
FIG. 5 is a perspective view of an axial member according to the first preferred embodiment of the present invention.

The axial member 30 has a shaft portion 32 provided with an end inserting into the axial hole 22 of the tubular member 20, and a head portion 34 located at the other end of the shaft portion 32. The shaft portion 32 is movable back and forth relative to the tubular member 20 along the imaginary axis L. Referring to FIG. 5, in the present embodiment, the shaft portion 32 has an annular notch 321, and a through hole 323 extending in a direction perpendicular to the imaginary axis L and inserted therein with a blocking shaft 325. The blocking shaft 325 is provided with two ends accommodated in the two side holes 24 of the tubular member 20. The head portion 34 is funnel-shaped. The head portion 34 has a hollow 341 located at a top end of the head portion 34, two openings 342 respectively located at two sides of the head portion 34, a through groove 343 dented from the hollow 341 and communicated with the two openings 342, a pin hole 344 penetrating through two side walls of the through groove 343 in a direction perpendicular to the imaginary axis L and inserted therein with a pin member 345, an outer periphery guiding inclined surface 346 located at an outer periphery of a top end of the head portion 34, and an inner guiding inclined surface 347 located at an inner periphery of the top end of the head portion 34. A bottom wall of the through groove 343 has a central portion 343a and two inclined surface portions 343b respectively located at two ends of the central portion 343a.

The elastic member 40 is accommodated in the axial hole 22 of the tubular member 20 and provided with a top end abutting against the shaft portion 32 of the axial member 30, and applies a force on the gear member 10 away from the axial member 30. The bottom end of the elastic member 40 is abutted against the gear member 10. In the present embodiment, the elastic member 40 is a spring. In other embodiments, the elastic member 40 may be replaced by other members which is elastic depending on demand.

Each of the engaging claws 50 is L-shaped, and has a body portion 52 rotatably disposed at the head portion 34 of the axial member 30, and a claw portion 54 located at an end of the body portion 52. The other end of the body portion 52 forms an abutting end 521. The claw portions 54 of the two engaging claws 50 are respectively located at two sides of the head portion 34 of the axial member 30, and the body portions of the two engaging claws 50 are located at a center of the head portion 34. In the present embodiment, the two claw portions 545 are respectively accommodated at the two openings 342 of the head portion 34, and the two body portions 52 are accommodated at the through groove 343 of the head portion 34 side by side. Each of the body portions 52 has a pin hole 523 into which the pin member 345 inserts, so that the two engaging claws 50 are pivotally connected with the axial member 30 by the pin member 345. In other embodiments, the two engaging claws 50 can be rotatably connected with the head portion 34 of the axial member 30 in other manners.

The torsional member 60 is connected with the axial member 30 and the two engaging claws 50, and applies a force turning the two engaging claws 50 outward. Specifically, the two engaging claws 50 swing downwardly around the pin member 315, so that the claw portions 54 swing downwardly and turn outward, and the two abutting ends 521 swing downwardly at the center of the head portion 34, in the meantime the body portions 52 of the two engaging claws 50 are abutted against the two inclined surface portions 343b. In the present embodiment, the torsional member 60 has an annular portion 62 disposed at the annular notch 321 of the shaft portion 32 of the axial member 30, two sleeving portions 64 respectively disposed at two sides of the annular portion 62 and inserted therein the body portions 52 of the two engaging claws 50. The two sleeving portions 64 are sleeved at around common borders between the body portions 52 and the head portions 54.

Figure 6:
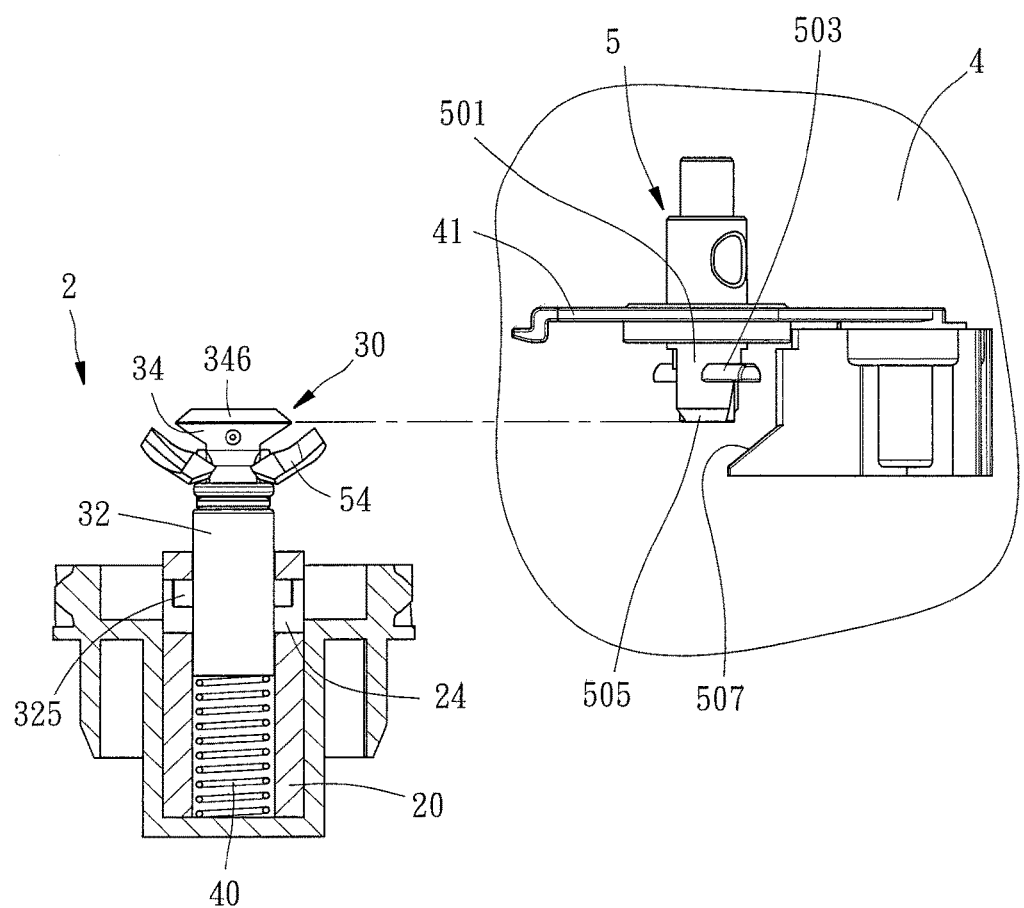
FIGS. 6 to 8 illustrate an engaging procedure of the transmitting assembly of the toner cartridge and a driving member of an electronic image forming apparatus according to the first preferred embodiment of the present invention.
Figure 7:
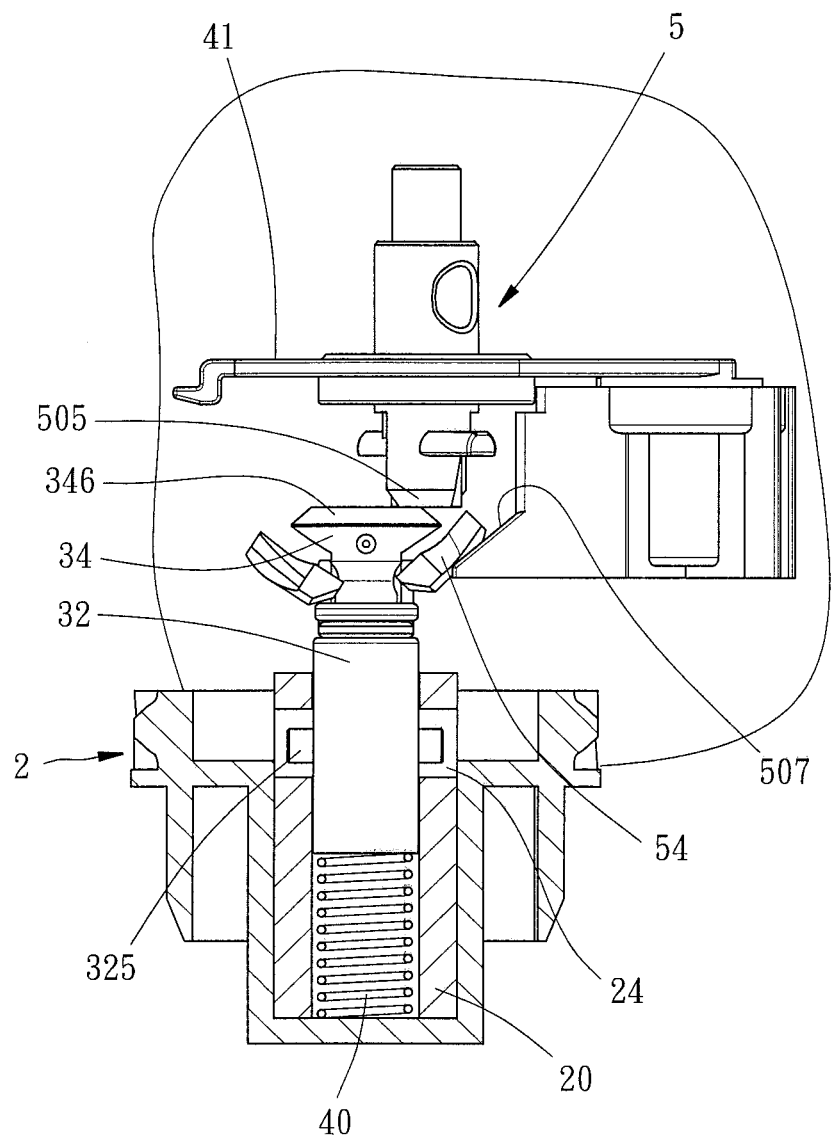
Figure 8:
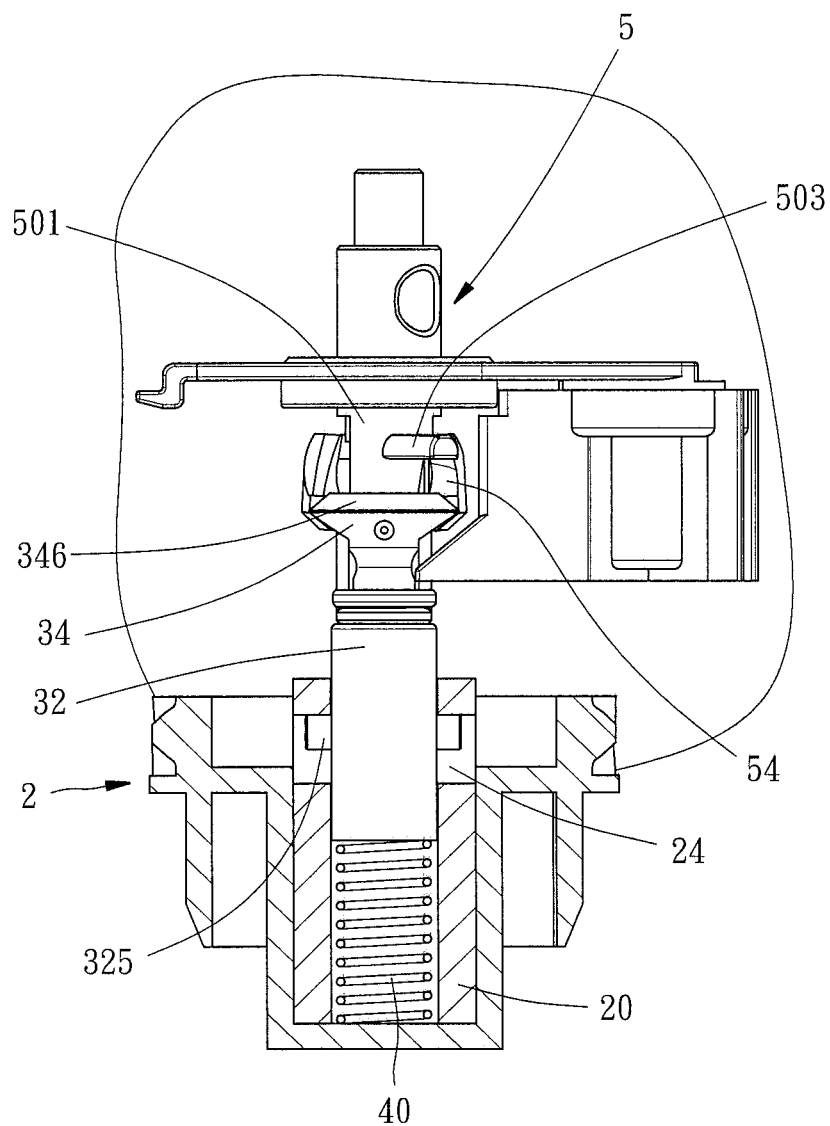

FIGS. 6 to 8 illustrate an engaging procedure of the transmitting assembly 2 and a driving member 5 inside a housing 41 of an electronic image forming apparatus 4. The driving member 5 has a main body 501 rotatably connected with the housing 41, two protruded posts 503 extending radially, and a guiding inclined surface 505 located at a tail end of the main body 501. A limiting position member 507 is disposed beside the driving member 5. When the transmitting assembly 2 is to be engaged with the driving member 5, the lowest periphery of the outer guiding inclined surface 346 of the head portion 34 of the axial member 30 is flush with the lowest periphery of the guiding inclined surface 505 of the driving member 5 as shown in FIG. 6. An elastic force is applied on the shaft portion 32 by the elastic member 40, so that the blocking shaft 325 is abutted against upper peripheries of the two side holes 24 of the tubular member 20. Referring to FIG. 7, the transmitting assembly 2 moves toward the driving member 5. When the outer guiding inclined surface 346 of the axial member 30 just comes into contact with the guiding inclined surface 505 of the driving member 5, a downwardly pushing component force is applied on the head portion 34 of the axial member 30 to compress the elastic member 40. The blocking shaft 325 also moves downwardly and no more abuts against the upper peripheries the two side holes 24 of the tubular member 20 until the top periphery of the head portion 34 is abutted against the bottom periphery of the driving member 5, and then the axial member 30 would not move downwardly anymore. In the meantime, the claw portion 54 of one of the engaging claws 50 of the transmitting assembly 2 is abutted against the limiting position member 507 and is turned slightly inward. Referring to FIG. 8, the transmitting assembly 2 keeps moving toward the driving member 5 until the transmitting assembly 2 directly faces the driving member 5 or is under the driving member 5. Because the top periphery of the head portion 34 is not abutted against the bottom periphery of the driving member 5 anymore, the axial member 30 moves upwardly by the elastic force from the elastic member 40, so that the blocking shaft 325 is abutted against the upper peripheries of the two side holes 24 of the tubular member 20 again. After the axial member 30 moves upwardly, the bottom end of the driving member 5 inserts into the hollow 341 of the head portion 34, the driving member 5 would push the abutting ends 521 of the two engaging claws 50 downwardly, the body portions 52 are not abutted against the two inclined surface portions 343b anymore, the claw portions 54 of the two engaging claws 50 swing correspondingly toward the head portion 34 until the claw portions 54 are abutted against the main body 501 of the driving member 5 and coupled with the two protruded posts 503. Accordingly, the rotational kinetic energy of the driving member 5 can be transmitted to the photosensitive roller 3 through the transmitting assembly 2.

Figure 9:
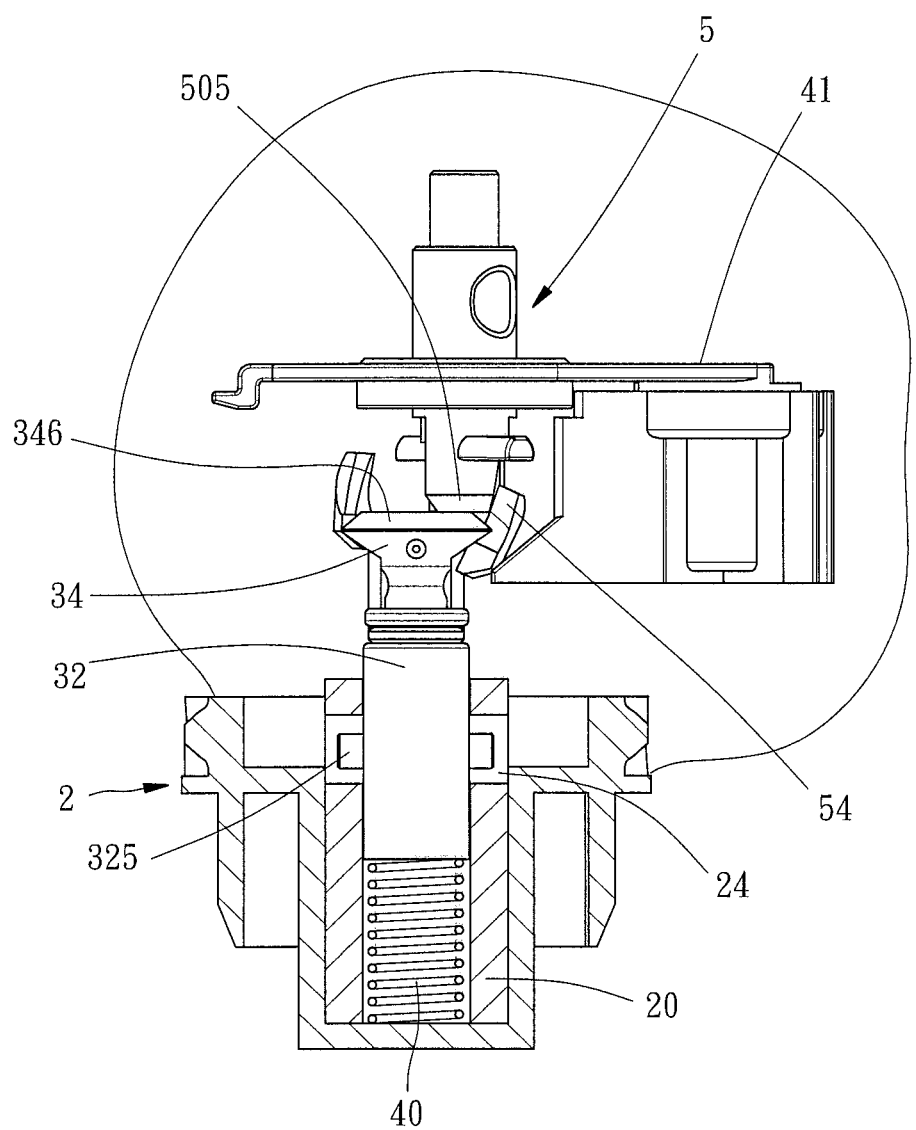
FIGS. 9 to 11 illustrate a separating procedure of the transmitting assembly of the toner cartridge and the driving member of the electronic image forming apparatus according to the first preferred embodiment of the present invention.
Figure 10:
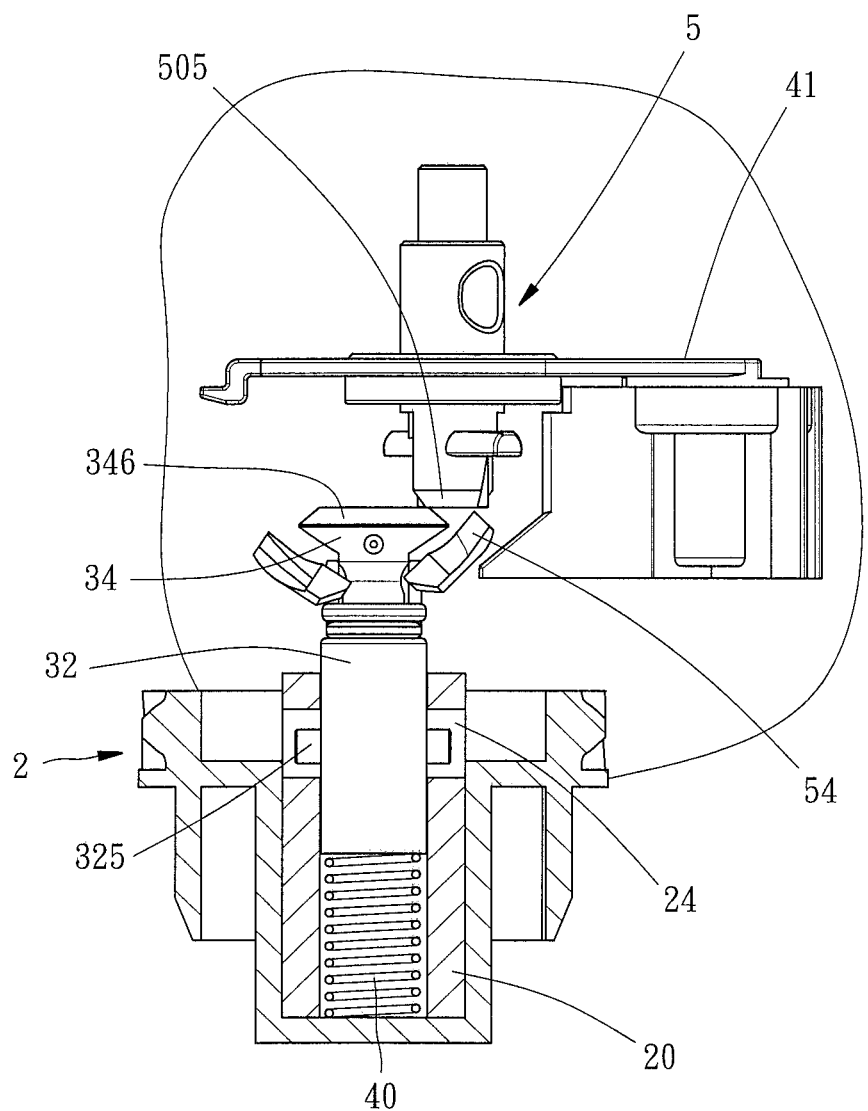
Figure 11:
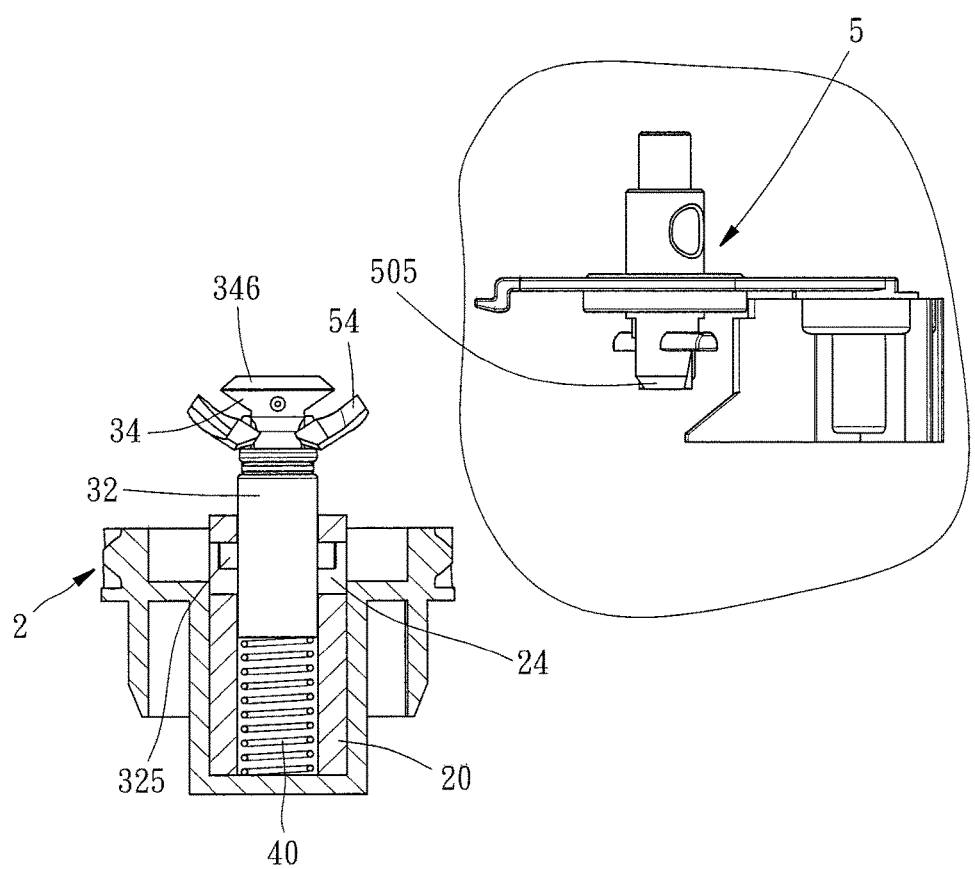

FIGS. 9 to 11 illustrate a separating procedure of the transmitting assembly 2 and the driving member 5, which is contrary to the aforementioned engaging procedure. The inner guiding inclined surface 347 and the guiding inclined surface 505 are abutted against each other, so that the axial member 30 compress the elastic member 40 downwardly, and the blocking shaft 325 is separated from the upper peripheries of the two side holes 24 until the top periphery of the head portion 34 is abutted against the bottom periphery of the guiding inclined surface 505 of the driving member 5, and the axial member 30 would not move downwardly anymore as shown in FIG. 9. Then, one abutting end 521 would not be pushed by the driving member 5 first because the engaging claw 50 at the right side of the figure is turned outward by the torsional member 60. Referring to FIG. 10, the other abutting end 521 is also not pushed by the driving member 5 because the engaging claw 50 at left side of the figure is turned outward by the torsional member 60. Referring to FIG. 11, when the head portion 34 of the axial member 30 is completely separated from the driving member 5, the axial member 30 moves upwardly by the elastic force from the elastic member 40, so that the blocking shaft 325 is abutted against the upper peripheries of the two side holes 24 of the tubular member 20 again and back to the original state, and the separating procedure of the transmitting assembly 2 and the driving member 5 is competed. Accordingly, the transmitting assembly 2 can be engaged with and separated from the driving member 5 with ease and smoothness.

Figure 12:
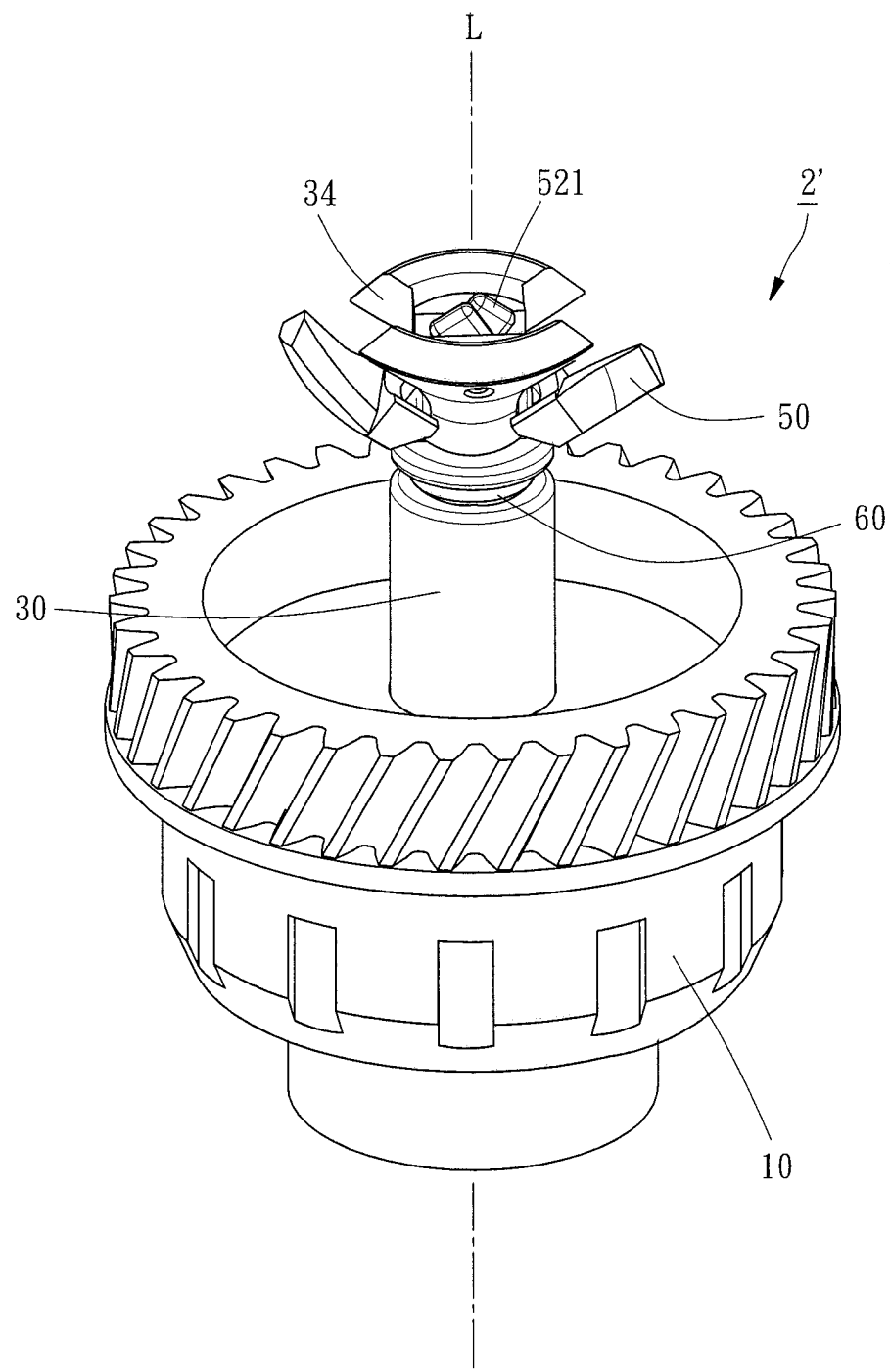
FIG. 12 is a perspective view of a transmitting assembly of the toner cartridge according to a second preferred embodiment of the present invention.
Figure 13:
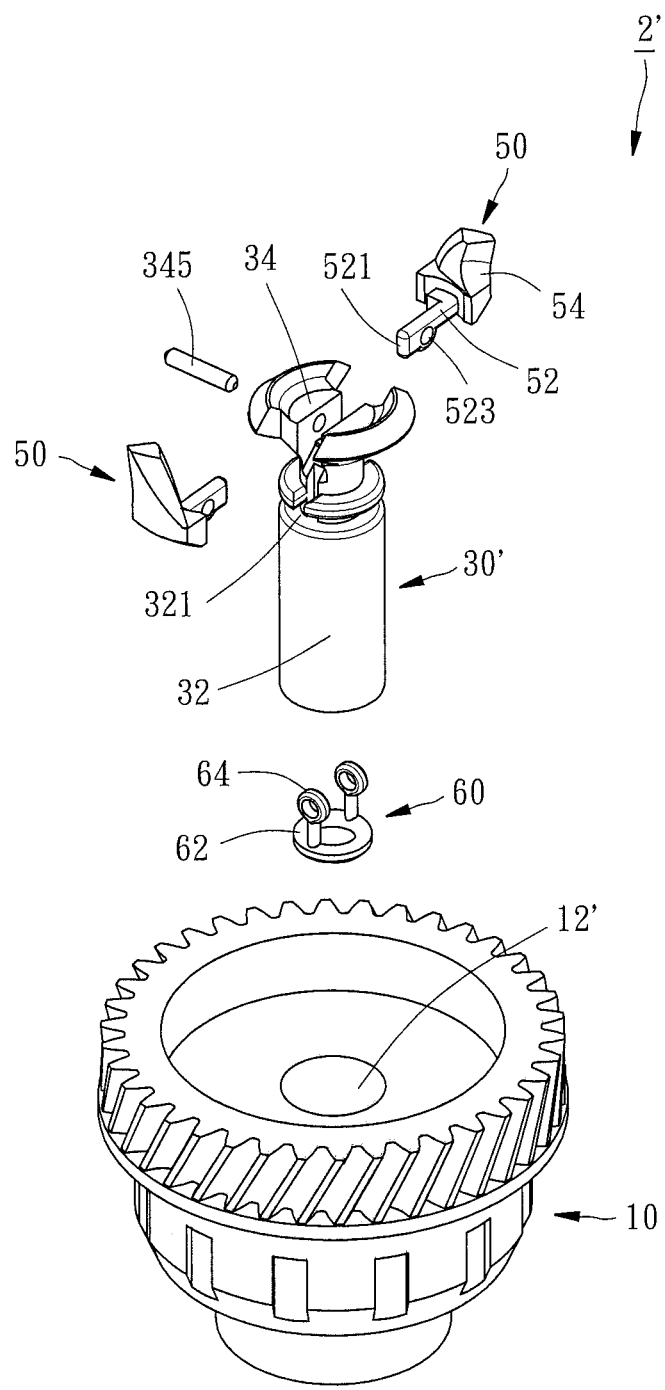
FIG. 13 is an exploded perspective view of the transmitting assembly of the toner cartridge according to the second preferred embodiment of the present invention.

FIGS. 12 and 13 is a transmitting assembly 2' of the toner cartridge 1 according to a second preferred embodiment of the present invention. The differences between the second and first preferred embodiments are, the tubular member 20, the blocking shaft 325 and the elastic member 40 are omitted in the transmitting assembly 2', an accommodating hole 12' of the gear 10 is directly accommodated therein with the shaft portion 32 of the axial member 30', the shaft portion 32 extends along the imaginary axis L and is not movable relative to the gear member 10. Because a back end of a driving member of an electronic image forming apparatus is pushed by a spring (not shown), when the transmitting assembly 2' is engaged with the driving member, a guiding inclined surface of the driving member is pushed by an outer guiding inclined surface 346 of the axial member 30', so that the driving member moves back upwardly, and the transmitting assembly 2' can move horizontally to a position under the driving member. Then, the driving member would move downwardly by an elastic force from the spring and abut against abutting ends 521 of the engaging claws 50, so that the two engaging claws 50 are turned inward and engaged with the driving member with the claw portions 54 thereof, and the engaging procedure of the driving member and the transmitting assembly 2' is competed. In contrary, when the transmitting member 2' is separated from the driving member, the inner guiding inclined surface 347 of the head portion 34 of the axial member 30 push the guiding inclined surface of the driving member upwardly, so that the driving member moves upwardly and compress the spring, and the transmitting assembly 2' can move horizontally away from the driving member. Then, the two abutting ends 521 are not pushed by the driving member anymore, the two engaging claws 50 is turned outward, the driving member moves downwardly to an initial position by the elastic force from the spring, and the separating procedure of the transmitting assembly 2' and the driving member is competed. Although the structure of the second preferred embodiment is simpler than the first preferred embodiment, the engaging and separating procedure of the transmitting assembly 2' and the driving member are as easy and smooth as the first preferred embodiment.

Based on the spirit of the invention, the structure of the transmitting assembly 2 can be modified. For example, the other end (the bottom end) of the elastic member 40 can be abutted against the tubular member 20, the gear member 10 or other portion of the transmitting assembly 2; the torsional member 60 can be replaced by torsional spring or other member hiving similar function depending on situation, or a compression spring can be disposed between the body portions 52 of the two engaging claws 50 and the bottom wall of the through groove 343, and the compression spring can push the two engaging claws 521 upwardly. The head portion 34 of the axial member 30 can be another shape, and the outer guiding inclined surface 346 and the inner guiding inclined surface 347 of the head portion 34 can be omitted, however, disposing the outer guiding inclined surface 346 and the inner guiding inclined surface 347 can help the transmitting assembly 2 to be engaged with or separated from the driving member 5 with further smoothness; the engaging manner of the axial member 30 and tubular member 20 can be modified if only the axial member 30 is still movable axially relative to the tubular member 20.

The above description represents merely the preferred embodiment of the present invention, without any intention to limit the scope of the present invention. The simple variations and modifications not to be regarded as a departure from the spirit of the invention are intended to be included within the scope of the following claims.

What is claimed is:
1. A transmitting assembly of a toner cartridge, adapted for being disposed at a photosensitive roller of the toner cartridge; the photosensitive roller having an imaginary axis; the transmitting assembly comprising:

a gear member, adapted for being disposed at an end of the photosensitive roller;

a tubular member, disposed at the gear member and having an axial hole, the axial hole extending along the imaginary axis;

an axial member, having a shaft potion provided with an end inserting into the axial hole of the tubular member, and a head portion located at the other end of the shaft portion; the shaft portion being movable relative to the tubular member along the imaginary axis;

an elastic member, accommodated in the axial hole of the tubular member and abutting against the shaft portion of the axial member, and applying a force on the axial member away from the gear member;

two engaging claws, each of the engaging claws having a body portion rotatably disposed at the head portion of the axial member, and a claw portion located at an end of the body portion; the other end of the body portion forming an abutting end; and a torsional member, connected with the axial member and the two engaging claws, and applying a force turning the two engaging claws outward.

2. The transmitting assembly of the toner cartridge as claimed in claim 1, wherein the claw portions of the two engaging claws are respectively located at two sides of the head portion of the axial member; the body portions of the two engaging claws are located at a center of the head portion.

3. The transmitting assembly of the toner cartridge as claimed in claim 1, wherein the gear member has an accommodating hole in which the tubular member is accommodated.

4. The transmitting assembly of the toner cartridge as claimed in claim 1, wherein the shaft portion of the axial member has a through hole extending in a direction perpendicular to the imaginary axis and inserted therein with a blocking shaft; the tubular member has two side holes in which two ends of the blocking shaft are respectively accommodated.

5. The transmitting assembly of the toner cartridge as claimed in claim 1, wherein the head portion of the axial member is funnel-shaped, and has a hollow located at an end of the head portion, two openings respectively located at two sides of the head portion, and a through groove dented from the hollow and communicated with the two openings; the claw portions of the two engaging claws are respectively accommodated in the two openings; the body portions of the two engaging claws are respectively accommodated in the through groove.

6. The transmitting assembly of the toner cartridge as claimed in claim 5, wherein the head portion of the axial member has a pin hole extending in a direction perpendicular to the imaginary axis and inserted therein with a pin member; the body portion of each of the engaging claws has a pin hole into which the pin member inserts, so that the two engaging claws are pivotally connected with the axial member.

7. The transmitting assembly of the toner cartridge as claimed in claim 5, wherein a bottom wall of the through groove has a central portion and two inclined surface portions respectively located at two ends of the central portion; the body portions of the two engaging claws are abutted against the two inclined surface portions.

8. The transmitting assembly of the toner cartridge as claimed in claim 1, wherein an outer periphery of a top end of the head portion of the axial member has an outer guiding inclined surface.

9. The transmitting assembly of the toner cartridge as claimed in claim 1, wherein an inner periphery of a top end of the head portion of the axial member has an inner guiding inclined surface.

10. The transmitting assembly of the toner cartridge as claimed in claim 1, wherein the torsional member has an annular portion disposed at the shaft portion of the axial member, and two sleeving portions respectively disposed at two ends of the annular portion; the body portions of the two engaging claws insert into the two sleeving portions, respectively.

11. The transmitting assembly of the toner cartridge as claimed in claim 10, wherein the shaft portion of the axial member has an annular notch in which the annular portion of the torsional member is accommodated.

12. A transmitting assembly of a toner cartridge, adapted for being disposed at a photosensitive roller of the toner cartridge; the photosensitive roller having an imaginary axis; the transmitting assembly comprising:

a gear member, adapted for being disposed at an end of the photosensitive roller;

an axial member, having a shaft potion provided with an end disposed at the gear member, and a head portion located at the other end of the shaft portion; the shaft portion extending along the imaginary axis;

two engaging claws, each of the engaging claws having a body portion rotatably disposed at the head portion of the axial member, and a claw portion located at an end of the body portion; the other end of the body portion forming an abutting end; and a torsional member, connected with the axial member and the two engaging claws, and applying a force turning the two engaging claws outward.

13. The transmitting assembly of the toner cartridge as claimed in claim 12, wherein the claw portions of the two engaging claws are respectively located at two sides of the head portion of the axial member; the body portions of the two engaging claws are located at a center of the head portion.

14. The transmitting assembly of the toner cartridge as claimed in claim 12, wherein the gear member has an accommodating hole in which the shaft portion of the axial member is accommodated.

15. The transmitting assembly of the toner cartridge as claimed in claim 12, wherein the head portion of the axial member is funnel-shaped, and has a hollow located at an end of the head portion, two openings respectively located at two sides of the head portion, and a through groove dented from the hollow and communicated with the two openings; the claw portions of the two engaging claws are respectively accommodated in the two openings; the body portions of the two engaging claws are respectively accommodated in the through groove.

16. The transmitting assembly of the toner cartridge as claimed in claim 15, wherein the head portion of the axial member has a pin hole extending in a direction perpendicular to the imaginary axis and inserted therein with a pin member; the body portion of each of the engaging claws has a pin hole into which the pin member inserts, so that the two engaging claws are pivotally connected with the axial member.

17. The transmitting assembly of the toner cartridge as claimed in claim 15, wherein a bottom wall of the through groove has a central portion and two inclined surface portions respectively located at two ends of the central portion; the body portions of the two engaging claws are abutted against the two inclined surface portions.

18. The transmitting assembly of the toner cartridge as claimed in claim 12, wherein an outer periphery of a top end of the head portion of the axial member has an outer guiding inclined surface.

19. The transmitting assembly of the toner cartridge as claimed in claim 12, wherein an inner periphery of a top end of the head portion of the axial member has an inner guiding inclined surface.

20. The transmitting assembly of the toner cartridge as claimed in claim 12, wherein the torsional member has an annular portion disposed at the shaft portion of the axial member, and two sleeving portions respectively disposed at two ends of the annular portion; the body portions of the two engaging claws insert into the two sleeving portions, respectively.

21. The transmitting assembly of the toner cartridge as claimed in claim 20, wherein the shaft portion of the axial member has an annular notch in which the annular portion of the torsional member is accommodated.

\* \* \* \* \*